Feb. 15, 1966 A. E. CRAIG 3,235,061
BELT DRIVE FOR MATERIAL HANDLING MACHINE
Filed Feb. 17, 1964 3 Sheets-Sheet 1
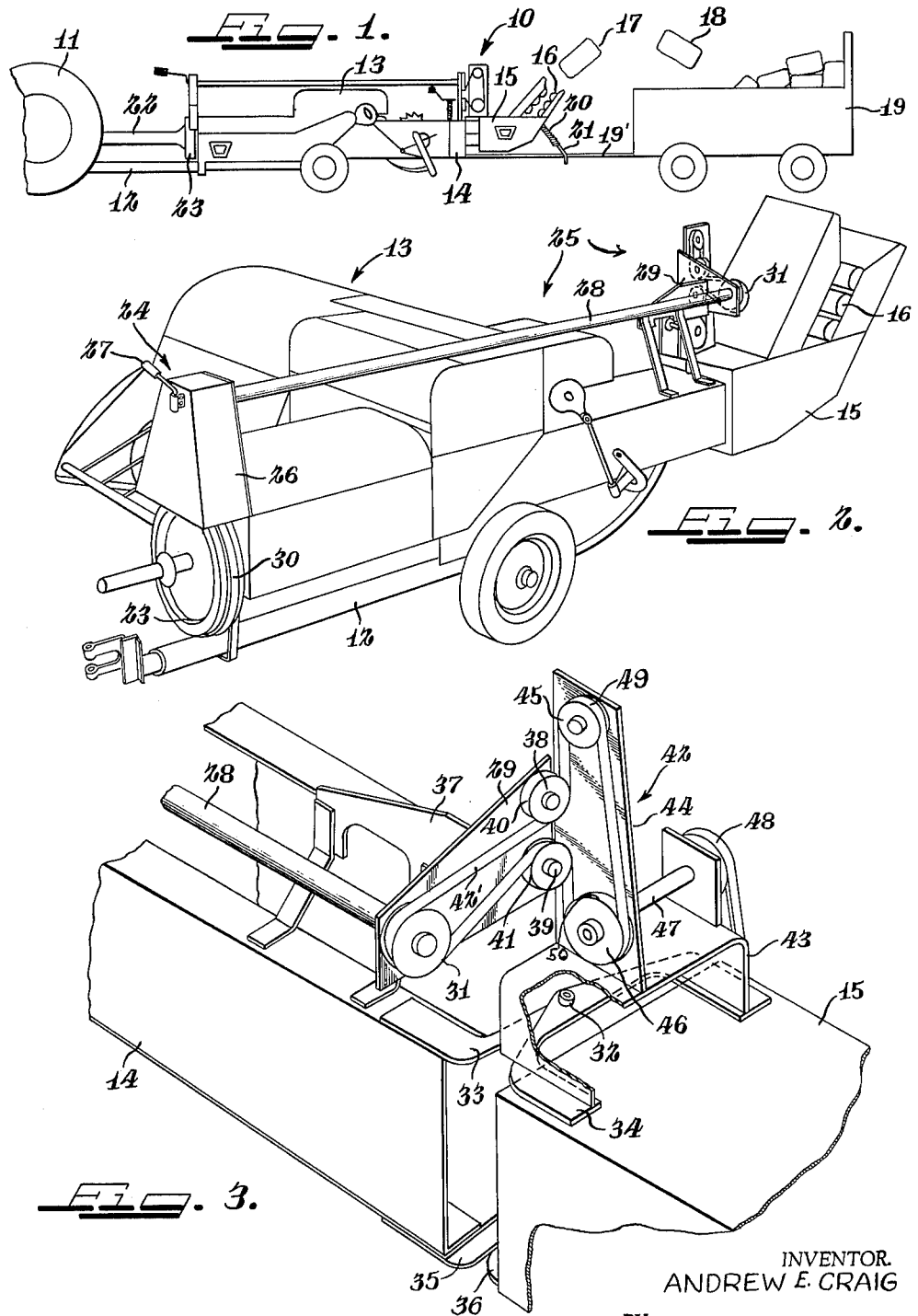
INVENTOR.
ANDREW E. CRAIG
BY
Greist, Lockwood, Greenawalt & Dewey
Attys.

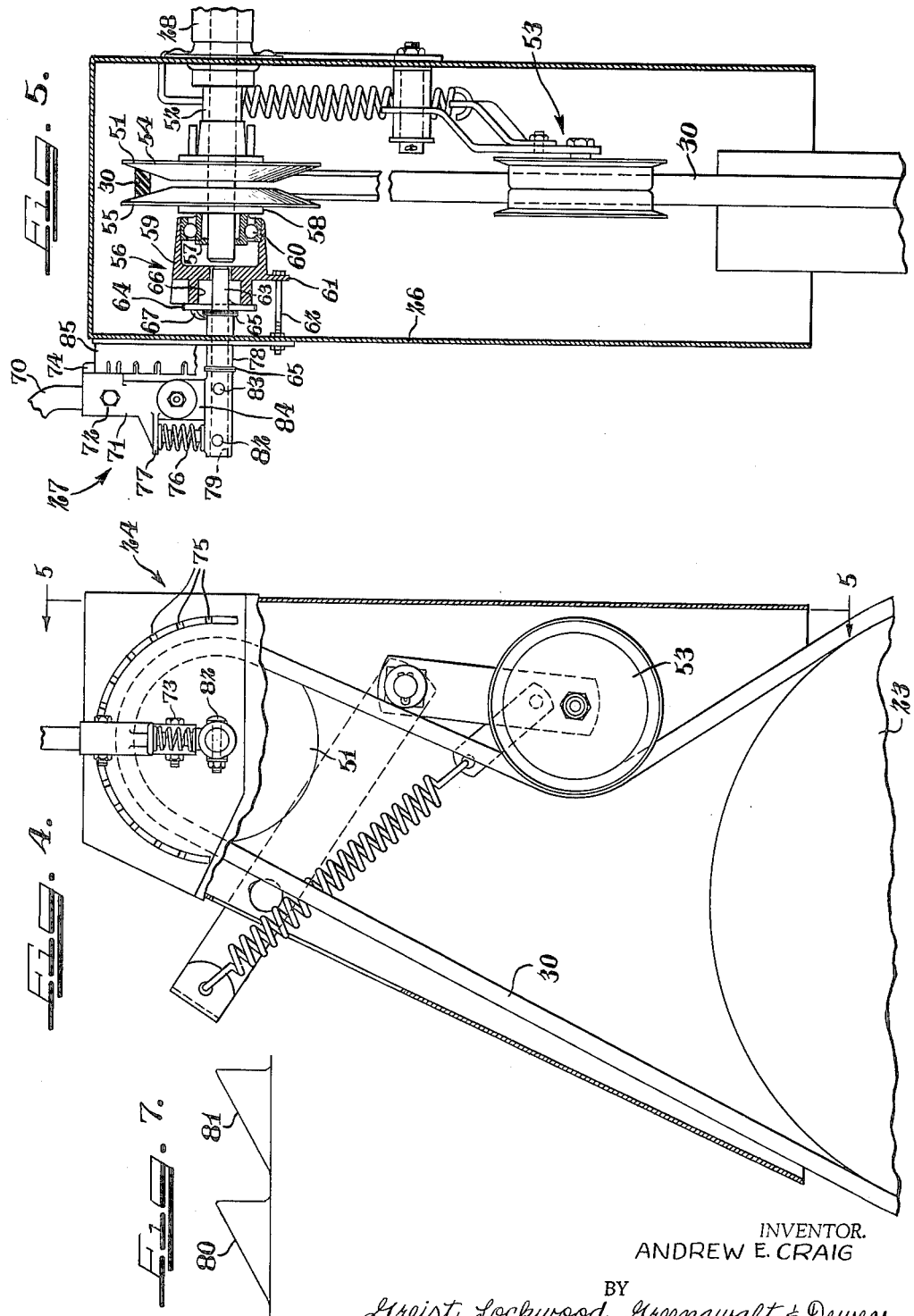

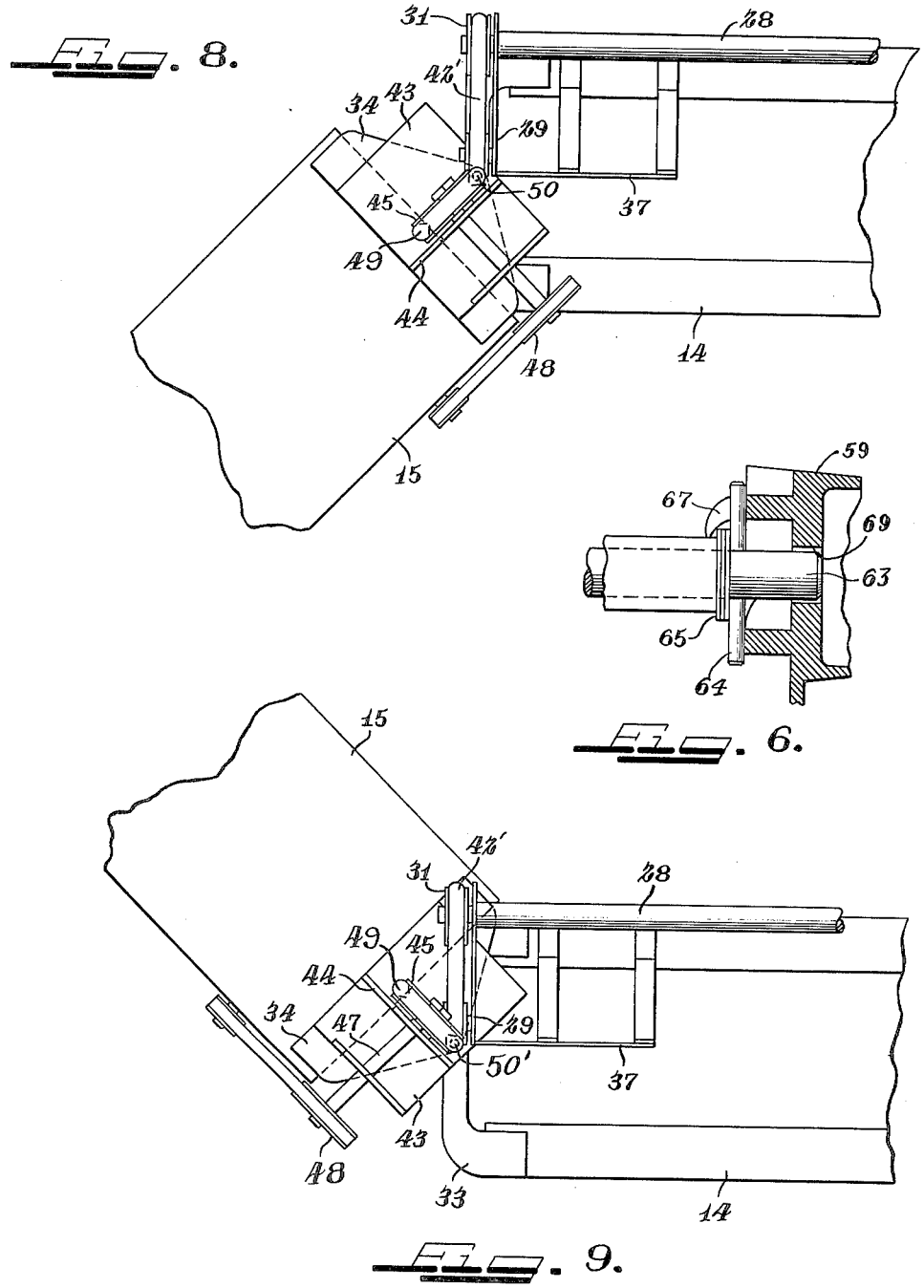

United States Patent Office 3,235,061
Patented Feb. 15, 1966

3,235,061
BELT DRIVE FOR MATERIAL HANDLING
MACHINE
Andrew E. Craig, Shelbyville, Ill., assignor to Oliver
Corporation, Chicago, Ill., a corporation of Delaware
Filed Feb. 17, 1964, Ser. No. 345,338
10 Claims. (Cl. 198—128)

This invention generally relates to a means for transmitting power between two machines, one of which is relatively movable with respect to the other. More specifically, the present invention concerns the transmission of variable speed power from a baler to a bale thrower, the latter being mounted for angular swinging movement at the discharge end of the baler and including a variable speed drive means for positively controlling the speed of the bale thrower.

Broadly speaking, bale throwers are old in the art and have been found useful in reducing the total labor required in baling operations. A bale thrower is mounted on the baler for lateral swinging movement, being generally pivotable about a vertical axis bisecting the discharge end of the baler. Suitable means is provided to resiliently connect the bale thrower to the tongue of a trailing wagon to maintain the trajectory of the thrown bale in general alignment with the longitudinal axis of the wagon. In this manner, the bale thrower receives the compacted and tied bales from the baler and propels them rearwardly into the trailing wagon, eliminating a great deal of manual effort which was formerly required in haying operations.

In the past, the bale thrower was sometimes driven by an independent source of power such as a gasoline engine mounted on the bale thrower and adapted to move therewith as the bale thrower pivoted in response to turning movements of the wagon. Later research efforts have been directed toward providing a suitable driving mechanism which will eliminate the use of a power source mounted on the bale thrower. In the case of the gasoline engine, considerable operational difficulty was encountered in the form of the air intake filter becoming clogged due to the high percentage of debris and other foreign matter which became airborne due largely to the baling and throwing operation.

The present invention is directed towards a new and improved drive means for transmission of rotary motion from the baler to the bale thrower in a simplified manner to minimize the number of working parts required, while not impairing the freedom of lateral or angular movement of the bale thrower about the vertical axis through the connection to the baler. Complementing this simplified form of drive means is a variable speed pulley mounted on the forward end of the baler and adapted to be driven from the power takeoff of the tractor or propelling device. Adjustment of the bale thrower speed is accomplished by varying the pulley diameter by means of a handle also mounted on the forward end of the baler.

The variable speed drive means is controlled from the tractor and is unique in that the degree of control exercised over the speed of the bale thrower is faster and more accurate than known devices, and can be easily set to repeat prior settings found to be satisfactory under certain conditions. Generally speaking, the present form of speed control permits the trajectory of the bale to be controlled in an easy manner without interfering with the continuity of the baling operation. Through the use of the simplified form of variable speed drive, the speed of the bale thrower may be controlled in such a manner that the trailing wagon can be loaded from back to front by a simple manual adjustment of the handle positioned for convenient and safe operation from the tractor without slowing down or stopping baling operations.

The variable speed drive means is of uncomplicated design, making it inexpensive from the manufacturing standpoint, as well as eliminating potential sources of maintenance difficulty. The drive assembly while being economical is designed with a view towards safeguarding those who are working around the machine.

Substantial benefits are derived from the present construction which were heretofore not obtainable with prior art devices, all of which will become readily apparent upon a consideration of the principal objects to be achieved and the simplified construction which accomplishes the stated objectives.

It is therefore an object of this invention to provide an improved means for supplying variable speed power from the forward end of the baler to a bale thrower which is mounted on the rearward end of the baler for angular swinging movement about a generally vertical axis.

It is a further object of this invention to provide a new and improved variable speed drive means incorporating means to select and reselect suitable speeds to project the bale the desired distance.

It is a further object of this invention to provide a new and improved means of transmitting power between machine devices which are hingedly connected for relatively free swinging movement therebetween, and wherein a novel belt drive is provided which will not impair the free swinging movement of one machine device with respect to the other, and further wherein a portion of the belt is in vertical alignment with the axis of swinging movement between the two machine devices.

It is a still further object of this invention to provide a bale thrower mounted for swinging movement on a baler including suitable means to provide variable speed driving power from the forward end of the baler to the laterally swingable bale thrower.

Further and fuller objects will become readily apparent when reference is made to the specification and accompanying drawings wherein:

FIG. 1 is a schematic side elevational view of a baler and bale thrower in operation having a wagon trailing rearwardly of the baler and the propelling means being shown fragmentarily;

FIG. 2 is a perspective view of the baler and bale thrower being provided with the variable speed drive means of the present invention;

FIG. 3 is an enlarged perspective view of the drive between the baler shown fragmentarily and the laterally swingable bale thrower also shown fragmentarily;

FIG. 4 is an enlarged fragmentary front elevational view of the variable speed control means mounted on the forward end of the baler;

FIG. 5 is a side elevational view taken generally along the lines 5—5 of FIG. 4 with portions of the variable speed drive shown in section;

FIG. 6 is an enlarged cross sectional view of the cam adjustment also shown in section in FIG. 5;

FIG. 7 is a plane diagrammatic view of the cam of FIGS. 5 and 6;

FIG. 8 is a top plan view of a rear portion of the baler and bale thrower with the bale thrower swung to one limit; and FIG. 9 is a top plan view of a fragmentary portion of the baler and the bale thrower swung to the opposite limit.

In FIG. 1, reference character 10 generally indicates a baler and bale thrower which is driven by means of the novel variable speed drive of the instant invention. The rear wheels 11 of a propelling device such as a tractor are shown fragmentarily, with a suitable hitch (not shown) on the tractor being connected to a drawbar assembly 12 attached to the framework of the baler 13.

The baler 13 is provided with a discharge end or bale case 14 which feeds the baled material directly into a bale thrower 15. The bale thrower 15 is provided with a series of conveyor rolls indicated generally at 16, to project the bales such as the ones shown at 17 and 18, through the air into a trailing wagon 19. The bale thrower 15 is resiliently connected to the wagon tongue 19' through a follower device composed of a resilient means such as a coil spring 20 having a forked arm portion indicated schematically at 21 to engage the opposite sides of the wagon tongue 19' to direct the bale thrower in the direction of the wagon 19.

The baler 13 is driven through a power takeoff shaft 22 extending from the usual power takeoff drive on the tractor to a fly wheel 23 on the forward end of the baler 13. During baling operations, the propelling device or tractor 11 draws the baler down the windrows to feed the material to be baled into the baler, where it is packed into bales weighing approximately 60 pounds and tied by suitable means well known in the art. The bale is then pushed out the discharge end 14 into the bale thrower 15. The conveyor rolls 16 of the bale thrower 15 are operated at a sufficient rate of speed to propel the bale through the air into the trailing wagon 19.

The variable speed drive of the present invention is indicated generally by the reference character 24 in FIG. 2 with the associated means for transmitting power from the baler to the bale thrower indicated generally by reference character 25. The variable speed drive is enclosed by a cover or shield 26 which provides a mounting for an operating handle assembly 27. A tubular housing 28 is mounted at one end in the shield 26 and extends rearwardly for mounting at the other end in a plate-like mounting bracket 29 suitably attached to the baler 14.

The shield 26 is of sufficient vertical depth to cover the fly wheel 23 at the point where the driving belt 30 leaves the fly wheel 23 as a safety feature to protect against objects becoming caught in the belt. A variable diameter pulley is mounted on the forward end of a drive shaft (not shown) housed in the tubular housing 28 and is driven by the belt 30 in a manner to be described in connection with FIGS. 4 and 5. The drive shaft (not shown) emerges on the rear side of the bracket 29 to rotate a drive pulley 31 providing a source of rotary power adapted to be transferred to the bale thrower 15 by the novel transmission means 25 of the present invention.

The manner of transferring the driving power of the pulley 31 to the bale thrower 15 is more evident in FIG. 3 which illustrates an enlarged fragmentary portion of the discharge end or bale case 14 and a fragmentary portion of the associated bale thrower. The bale case 14 and bale thrower 15 are interconnected by means of a pivotable connection 32, having a central vertical axis generally bisecting the bale case 14. The connection 32 may be made by a bearing bolt, hinge pin or the like, passing through suitable aligned apertures on a pair of overlapped U-shaped members such as those indicated at 33 and 34 on the bale case and bale thrower respectively. The lower portion of the bale case 14 and bale thrower 15 are provided with similar members 35 and 36 and a connecting pin (not shown) to mount the bale thrower for lateral swinging movement about the central vertical axis passing through both connections.

As mentioned briefly above, it is desirable to provide a means of transmitting power from the power or drive pulley 31 to the bale thrower 15 without impairing the freedom of angular or lateral swinging movement of the bale thrower 15, with such being accomplished in the simplest manner to provide the most efficient type of driving mechanism. The transverse mounting plate 29 serving as the mounting means for the pulley 31, is supported by means of a mounting bracket 37 attached to the bale case 14. First and second pulley members 38 and 39 are mounted for rotation about horizontal axes which are in substantial parallelism with each other and the rotary axis of the drive pulley 31. Each of the pulleys 38 and 39 is provided with a belt receiving groove 40 and 41 respectively to guide the endless belt 42' which feeds around the driving pulley and around the portion of each of the first and second pulleys 38 and 39 in the manner shown.

A second bracket mounting assembly 42 is attached to the bale thrower by means of an upstanding U-shaped bracket 43 which has a vertically disposed longitudinally extending plate member 44 projecting upwardly therefrom. The plate member 44 mounts third and fourth pulleys 45 and 46 respectively for rotation about substantially horizontal axes at right angles to the axes of the pulleys 38 and 39 when the bale thrower is in the neutral position shown. A drive shaft 47 relays the power from the fourth pulley 46 to a bale thrower drive pulley 48 which drives the rollers, such being in a manner well known. Each of the pulleys 45 and 46 is provided with belt grooves 49 and 50 of similar configuration to those on the pulleys heretofore described. The endless belt 42' extends upwardly from the pulley 38 and over the pulley 45 downwardly around approximately a full 180° of the pulley 46 then upwardly over the pulley 39 back to the drive pulley 31 in the manner which is clearly seen. The belt 42' may be of any suitable type such as a V belt, round belt or the like.

Through the use of the present simplified drive assembly the bale thrower is allowed to swing relative to the bale case 14 without requiring idlers to compensate for change in the belt length as the bale thrower swings angularly relative to the baler 14. This is made possible by positioning each of the pulleys 38 and 39 and the pulleys 45 and 46 in a mannner whereby a portion of the belt receiving groove on each will be in vertical alignment with the central vertical axis about which the bale thrower 15 swings. The central axis may fall within the geometric center of the belt, or tangent to the bottom of the pulley groove with the preferred form having the central axis in alignment with the pitch line on the pulley which is the true point of belt contact on the pulley.

Accordingly, as the bale thrower 15 moves angularly with respect to the baler 14, in response to turning movement of the wagon or in baling operations conducted on non-uniform terrain or like circumstances, the swinging movement of the bale thrower 15 to align the same with the wagon 19, will not result in a change in the length of the continuous belt 42, but will permit the belt to remain of constant length regardless of the direction or magnitude of angular movement.

As is more clearly seen in FIGS. 8 and 9, the central vertical axis of swinging movement has been designated by reference character 50' being in vertical alignment with the connecting pin 32. In FIG. 8, the bale thrower 15 has been swung to its counterclockwise limit being at an angle of about 45° with respect to the neutral position shown in FIG. 3. The clockwise limit is similarly illustrated in FIG. 9, being at an angle of about 45° with respect to the neutral position also. In movement to either position, the angular rotation occurs about the fixed central vertical axis 50', so that the turning movement is readily accommodated by the belt 42 merely twisting a slight amount as it extends between the pulleys 38 and 39 and 45 and 46 respectively.

As indicated in dotted lines in FIGS. 8 and 9, the belt may be of a conventional V type construction or any other suitable form to provide good driving motion between all of the pulleys. When the bale thrower is in the neutral position, a 90° twist is required for the belt to change direction as it is received over the pulleys 45 and 46 from the pulleys 38 and 39. The 90° twist will either increase or decrease a slight amount depending upon the direction the bale thrower 15 swings. Regardless of the direction of swing, however, the length of the belt 42 remains constant providing continuous, even rotation to the bale thrower driving pulley 48.

As is seen in the plan view of FIGS. 8 and 9, the vertical axis 50' falls generally in the central portion of the belt as it passes through the groove portions of the vertically aligned pulleys thus insuring that the belt 42 will maintain constant tension regardless of the position of the bale thrower. It is to be appreciated that the novel arrangement permits the number of parts to be minimized without sacrificing the desired operational performance.

It is desirable to control the speed of the bale thrower conveyor rolls 16 in order to permit the wagon to be loaded uniformly and guard against the bales being over or under thrown. In those instances, where the tractor is turning or operating on a side hill, the distance the bale may be thrown is somewhat less than under ordinary conditions, and therefore the speed of the conveyor rolls 16 must be carefully controlled. To the attainment of this end, a variable speed drive assembly indicated at 24 is provided on the forward end of the baler to enable positive control over the speed of the conveyors to be exercised. In FIGS. 4 and 5, the fly wheel 23 and belt 30, are shown fragmentarily and a portion of the shield 26 is cut away to expose the means to vary the speed of the bale thrower 15.

The belt 30 drives a pulley 51 of variable diameter mounted for driving rotation on the drive shaft 52 which extends through the tubular housing 28 shown fragmentarily in FIG. 5. The tension of the belt 30 is maintained constant through the use of a spring biased idler roll assembly shown generally at 53. The variable diameter pulley 51 is formed of two disk like pulley forming members 54 and 55 each of which is rotatable with the drive shaft 52. The outboard pulley forming disk 55 is axially shiftable relative to the driving shaft 52 while the other pulley forming disk 54 is longitudinally fixed on the driving shaft 52 thereby to permit changes in the effective diameter of the pulley by controlling the spacing between the pulley forming members 54 and 55.

A collar assembly indicated generally at 56 includes a rotatable thrust collar 57, which abuts a raised boss or thrust washer 58, on the pulley forming disk 55 to maintain the pulley forming member 55 in any selected axial position. The thrust collar 57 is joined to a coaxial outer collar member 59 by means of an interposed antifriction bearing 60 which permits the thrust collar 57 to rotate with the shaft 52 and pulley 51, while allowing the outer collar member 59 to remain stationary. Rotation of the outer collar 59 is positively prevented by means of an integral lug portion 61 on the collar 59 being joined to the shield 26 by a bolt 62.

A stub shaft 63 is mounted for rotation in a sleeve 78 held in the shield 26 and carries the handle assembly 27 at its outer end and a cross pin 64 at the other. In the enlarged view of FIG. 6, a fragmentary portion of the outboard end of the outer collar member 59 is illustrated, having an enlarged cylindrical bore 66 to define an annular housing 69 which freely receives the end portion of the stub shaft 63. The outer end portion of the annular collar 59 is provided with a cam surface 67, the particular construction of which is more clearly apparent in FIG. 7, which will be discussed more completely hereinafter.

As seen in FIGS. 5 and 6, the cross pin 64 serves as a cam follower acting against the cam surface 67 for forcing the outer collar 59 axially in response to rotation of the axially fixed stub shaft 63. The outer end of the stub shaft 63 mounts the handle assembly 27 briefly mentioned above in a manner so as to be conveniently accessible from the tractor. An operating handle portion 70 is received in a handle mounting sleeve member 71 and held thereto by means of a transverse bolt 72 passing through the interfitted members. Obviously, the length of the handle 70 will be dictated by the type of tractor used for propulsion and/or the length of the drawbar 12. In any event, the present construction allows the substitution of a longer or shorter handle to be easily accomplished by merely removing the bolt 72, withdrawing the handle 70 and inserting a handle of appropriate length and bolting the same in place.

A tubular sleeve 79 is coaxially received over and fastened to the outer end of the stub shaft 63 by means of transverse bolts 82 and 83 so as to be rotatable therewith. An upwardly projecting lug 84 on the sleeve 79 receives downwardly projecting bifurcated portions of the handle mounting sleeve 71 and a bearing bolt or rivet 73 joins the two for longitudinal pivoting movement therebetween for reasons to become apparent. Angular movement of the handle 70 about the stub shaft axis will be reflected in like angular rotation of the stub shaft 63 and cross pin 64. Thrust washers 65 are positioned between the fixed and rotary parts enhancing the ease of rotation of the stub shaft 63, sleeve 79 and cross pin 64 with respect to the fixed mounting sleeve 78.

Suitable stop means is provided to maintain the handle in any selected position. A key portion 74 is formed on the sleeve 71 and is of suitable transverse dimension to be slidably received in radially directed slots 75 formed in a semi-circular flange 85 mounted on the front of the shield 26. The key 74 is maintained in the selected slot 75 by means of a biasing spring 76 acting between the sleeve 79 attached to the stub shaft 63 and a forwardly directed shoulder 77 on the handle mounting sleeve 71. Thus, in the absence of external forces on the handle, the key will remain in the selected slot to prevent angular movement of the handle.

As is more clearly evident in FIG. 4, the handle 70 is angularly movable to different settings through approximately 180° to effect speed adjustment. If a wider range of speed settings is desired, it is contemplated that angular adjustment through a full 360° or any part thereof could be provided. This, however, would require the cam surface to be a continuous rise through 360° and require a single cam follower to be used. In the present circumstances, it has been found that satisfactory operational speeds can be selected by the double cam surface 67 and co-operating double cam follower (cross pin) 64.

The schematic view of FIG. 7 illustrates the double cam surfaces 80 and 81 in planar form, with identical points on each of the surfaces being 180° apart to accommodate the cross pin 64 serving as a double cam follower. The rise of each of the cam surfaces is dictated by the selected size and the desired axial travel of the pulley forming disk 55 after consideration of the fly wheel size and operating speed.

In operation, the baler 13 will be run at the required speed directly off the power takeoff shaft 22. The bale thrower 15 derives its power from the baler fly wheel 23 and as described above, may be readily adjusted to obtain the satisfactory bale trajectory. In the initial stages of baling, when it is desired to load the rear of the trailing wagon 19, the bale trajectory will be the greatest requiring a high speed setting of the handle 70. In the present instance, the handle 70 will be closed to or at its clockwise limit depending on the wagon length, length of tongue, etc. The tension of the V belt 30 provides an axial component serving to push the pulley forming disk 55 axially on the shaft 52 maintaining it against the rotatable collar 57 and thereby reducing the effective diameter of the variable speed pulley 51. Accordingly, the shaft 52 will rotate at a faster rate, thereby driving the conveyor rolls 16 at a faster rate since the remaining pulleys in the power train are of fixed diameter. As a result, the bales will be propelled to the rear of the trailing wagon.

As the trailing wagon 19 becomes loaded in the rear portion and a shorter trajectory of the bales is desired, the handle 70 may be pivoted forward to unlock the same and angularly moved in a counterclockwise direction, causing the cam follower cross pin 64 to move to a higher point on the cam surface 67. This causes the non-rotatable outer collar 59 to shift axially, and results in the inner rotatable collar 57 moving axially also to force the pulley forming disk 55 towards its counterpart disk 54. Accordingly, the effective diameter of the variable speed pulley 51 increases, causing the operating speed of the shaft 52 to be reduced. As expected, the speed of the conveyor rolls 16 diminishes with the consequence that the bales are thrown a shorter distance. The slowest speed available can be selected by moving the handle 70 to the counterclockwise limit.

In practice, the adjustment of the speed may be made quickly directly from the tractor without interfering with the normal speed of operations. On corners and uneven terrain, the wagon will not trail properly and generally will be slightly offset from the rear of the baler 13. Under these conditions, the bale thrower 15 must be run at slower speed so as to not project the bales over the sides of the wagon. With the present variable speed drive, adjustment of the conveyor speed is practically instantaneous and once the appropriate settings have been determined for a particular set of conditions, they may be reselected with unequaled ease. As a result, the number of bales which are overthrown is severely reduced and the entire job of baling is more simplified and efficient.

After consideration of the principles set forth herein, it will be immediately obvious to those skilled in the art that further modifications could be made without departing from the inventive concepts embodied herein. Accordingly, any limitations imposed are to be within the spirit and scope of the appended claims.

I claim:

1. In a machine handling operation in which a first machine processes material and a second machine receives said processed material for conveying therefrom, said second machine being pivotably mounted with respect to said first machine so as to swing about a pivot axis, the combination therewith of a belt drive means for transmitting power from one machine to the other without impairing the free swinging movement therebetween, said belt drive means including a driving pulley mounted on one of said machines, first and second idler pulleys also mounted on said one machine and having a portion of the pitch line thereof in alignment with said pivot axis, an idler pulley mounted on the other machine, and having a portion of the pitch line thereof in alignment with said pivot axis, a driven pulley spaced from said last mentioned idler pulley and having a portion of the pitch line thereof in line with said pivot axis, and an endless belt extending over said pulleys to continuously drive said driven pulley on said other machine without impairing the free swinging movement of one machine with respect to the other.

2. The combination of claim 1 including means mounted on said first machine to selectively vary the speed of said driving pulley thereby selectively varying the speed of said second machine irrespective of its position relative to said first machine.

3. The combination of claim 2 wherein said means to selectively vary the speed of said driving pulley includes a variable diameter power pulley having first and second pulley forming disks axially movable with respect to each other and being mounted on the forward end of a drive shaft connected to said driving pulley, and means is provided to change the effective diameter of said drive pulley whereby said conveying machine speed may be varied.

4. The device of claim 3 wherein said means to change the effective diameter of said pulley includes a non-rotatable axially shiftable collar assembly having a freely rotatable portion abutting one of said pulley disks, a handle assembly mounted for angular rotation on said first machine, cam means mounted on one of said assemblies with the co-operating cam follower means mounted on the other of said assemblies whereby said pulley disk may be moved axially relative to said other pulley disk to vary the effective diameter thereof and thereby effectively control the speed of said conveying machine.

5. In a combined baler and bale thrower unit wherein the baler has a power delivering pulley mounted adjacent the discharge end of the bale case which is interconnected in driving relationship with the power input of said baler, and the bale thrower has a power receiving pulley mounted thereon, and wherein the bale receiving end of said bale thrower is pivotally connected to the bale discharge end of said baler whereby said bale thrower may swing laterally from side to side about a pivot axis, the improvement which comprises power transmitting means interconnecting said power delivery pulley with said power receiving pulley, said means comprising a pair of juxtaposed idler pulleys mounted on said bale case to one side of said power delivery pulley and in such a manner that said pivot axis is substantially tangential to the pitch line of said pair of idler pulleys on corresponding sides thereof, a single idler pulley mounted on said bale thrower in spaced relationship with respect to said power receiving pulley, said single idler pulley and said power receiving pulley being so mounted that said pivot axis is tangential to the pitch line thereof, and an endless belt connecting all of said pulleys.

6. A variable speed drive for a bale thrower comprising in combination, a baler having front and rear ends, said front end adapted to be connected to a propelling means, a fly wheel on said front end for connection to a source of driving power on said propelling means, a bale case on the rear end of said baler, a bale thrower mounted on said bale case for pivoting movement about a generally vertical axis, said bale thrower being substantially in axial alignment with said bale case when in a neutral position, drive means for transmitting power from said fly wheel to said bale case, said drive means including a longitudinally extending drive shaft, support means mounting said shaft on said baler, first and second pulley means mounted on one of said support means and having belt receiving grooves therein, each of said first and second pulleys having a portion of said belt receiving grooves in vertical alignment with said vertical axis about which said bale thrower swings, pulley support means on said bale thrower, first and second pulley means on said pulley support means, each of said pulley means on said bale thrower having belt receiving grooves with a portion thereof in alignment with said vertical axis, means connected to one of said pulleys on said bale thrower for driving conveyor rolls on said bale thrower, an endless belt around a portion of each of said pulleys, said belt also extending around a portion of a drive pulley on one end of said drive shaft, and means on the front end of said drive shaft to vary the speed thereof whereby the speed of said bale thrower may be varied.

7. The drive of claim 6 wherein said means on the front end of said drive shaft includes a variable diameter pulley and means to selectively adjust said diameter from said propelling means.

8. The drive of claim 7 wherein said means to selectively adjust the diameter of said pulley includes an axially fixed rotatable cam follower acting against an axially movable non-rotatable cam surface, and said cam surface acting against a movable portion of said variable diameter pulley.

9. A baler having a bale thrower pivotally attached thereto, said baler having a drive shaft mounted thereon with one end adjacent a forward end of said baler, said drive shaft extending rearwardly of said baler and having the other end adjacent said bale thrower, means pivotally connecting said bale thrower to said baler for lateral swinging movement about an axis, a drive pulley connected to the other end of said drive shaft, means to transmit rotary motion from said drive pulley to said bale thrower, said means including first and second pulley members mounted on said baler and rotatable about a generally horizontal axis, each of said pulleys having a belt receiving groove thereon, each of said belt receiving grooves having a portion thereof in vertical alignment with said axis, third and fourth pulleys mounted on said bale thrower for rotation about a generally horizontal axis, each of said third and fourth pulleys having a belt receiving groove thereon, a portion of each of said belt receiving grooves on said third and fourth pulleys being in vertical alignment with said axis, an endless belt connecting said pulleys, and means to transmit power from one of said third and fourth pulleys to a driving roller means on said bale thrower.

10. In a material handling operation wherein a first machine processes material and a second machine receives said processed material, one of said machines being mounted for swinging movement relative to the other machine about a pivot axis, the improvement which comprises the provision of a belt drive means to transmit power from one machine to the other without impairing the free swinging movement therebetween, said belt drive means including a driving pulley mounted on said first machine, a pair of idler pulleys mounted on said first machine in spaced relation to said driving pulley, each of said idler pulleys having a portion of the pitch line thereof intersecting said pivot axis, an idler and driven pulley mounted on said second machine, each of said last mentioned pulleys having a portion of the pitch line thereof intersecting said pivot axis, and an endless belt connecting said driving pulley and said driven pulley, a portion of said belt extending from each of said idler pulleys on said first machine to the idler and driven pulleys respectively on said second machine, said portion of said belt containing said pivot axis to permit free swinging movement of one machine relative to the other without effecting the transmission of motion therebetween.

References Cited by the Examiner
UNITED STATES PATENTS
2,715,893  7/1955  Springer.

SAMUEL F. COLEMAN, *Primary Examiner.*

RICHARD E. AEGERTER, *Examiner.*